United States Patent
Chung (10) Patent No.: US 7,224,997 B2
(45) Date of Patent: May 29, 2007

(54) APPARATUS AND METHOD FOR RADIO SIGNAL PARALLEL PROCESSING

(75) Inventor: Jae-ho Chung, Gyeonggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 390 days.

(21) Appl. No.: 10/724,039

(22) Filed: Dec. 1, 2003

(65) Prior Publication Data

US 2004/0110482 A1    Jun. 10, 2004

(30) Foreign Application Priority Data

Dec. 10, 2002    (KR) .................... 10-2002-0078162

(51) Int. Cl.
*H04M 1/00* (2006.01)
(52) U.S. Cl. ................... 455/552.1; 455/553.1
(58) Field of Classification Search ............... 455/132, 455/145, 146, 207, 209, 314, 315, 318, 334, 455/552.1, 553.1, 133, 136, 208
See application file for complete search history.

(56) References Cited

U.S. PATENT DOCUMENTS 5,966,646 A    10/1999    Lampe et al.
5,966,666 A *  10/1999    Yamaguchi et al. ..... 455/552.1
6,014,571 A *  1/2000    Enoki ..................... 455/552.1
6,393,299 B1 *  5/2002    Mizumoto et al. ....... 455/552.1
6,804,261 B2 * 10/2004    Snider ........................ 370/478

FOREIGN PATENT DOCUMENTS

| CN | 1251701 A | 4/2000 |
|---|---|---|
| JP | 55-168255 | 5/1954 |
| JP | 10-303776 A | 11/1998 |
| JP | 2000-295132 A | 10/2000 |
| JP | 2001-24536 A | 1/2001 |

* cited by examiner

*Primary Examiner*—Lana Le
*Assistant Examiner*—Christian A. Hannon
(74) *Attorney, Agent, or Firm*—Sughrue Mion, PLLC (57) ABSTRACT

An apparatus and method for radio signal parallel processing are provided, wherein the apparatus, which receives and processes in parallel a first and second carrier signal of frequencies $\omega 1$ and $\omega 2$ ($\omega 2 > \omega 1$), includes: a first local oscillator which outputs a signal of frequency $\omega$ to a first frequency mixer which converts the first carrier signal into a signal of a first intermediate frequency ($\omega - \omega 1$) and a signal of another first intermediate frequency ($\omega + \omega 1$), and outputs the converted signals; and a second frequency mixer which converts the second carrier signal into a signal of a first intermediate frequency ($\omega 2 - \omega$) and a signal of another first intermediate frequency ($\omega 2 + \omega$), and outputs the converted signals. With the above, the capacity of data reception and transmission increases, the complexity of implementing the apparatus is low, and the cost of manufacturing the apparatus is reduced.

17 Claims, 5 Drawing Sheets

APPARATUS AND METHOD FOR RADIO SIGNAL PARALLEL PROCESSING

This application claims the priority of Korean Patent Application No. 2002-78162, filed Dec. 10, 2002, the disclosure of which is incorporated herein by reference in its entirety.

BACKGROUND OF THE INVENTION

1. Field of the Invention

Apparatuses and methods consistent with the present invention relates to an apparatus and method for radio signal processing in a radio receiver, and more particularly, to an apparatus and method in which two carrier signals, having different frequencies, are simultaneously received and processed in parallel in a superheterodyne receiver, which then outputs two baseband signals by down-converting the received carrier signals into low frequency signals.

2. Description of the Related Art

A superheterodyne receiver receives a carrier signal, twice down-converts the signal into an intermediate frequency, and outputs a baseband signal. A superheterodyne receiver that twice down-converts a carrier signal into an intermediate frequency is referred to as a dual intermediate frequency (IF) superheterodyne radio frequency receiver. The baseband signal indicates the signal of the original frequency band before it is modulated by the source side into a high frequency band signal.

Superheterodyne receivers are widely used in areas of wireless communications, such as wireless telephony, radio broadcasting, and wireless LANs.

Meanwhile, as the amount of data transmitted through wireless telecommunications increases, there are increasing demands for data processing capacities at the source and destination.

However, since the prior art superheterodyne receiver receives only one carrier signal and outputs a single baseband signal, it cannot meet this requirement.

SUMMARY OF THE INVENTION

The present invention provides an apparatus and method for radio signal parallel processing, which increases the capacity of transmitting and receiving data, lowers the complexity of implementing the apparatus, and reduces the cost of manufacturing.

According to an aspect of the present invention, there is provided a radio signal parallel processing apparatus which receives and processes in parallel a first carrier signal of frequency $\omega 1$ and a second carrier signal of frequency $\omega 2 (\omega 2 > \omega 1)$, the apparatus comprising: a first local oscillator which outputs a signal of frequency $\omega$; a first frequency mixer which receives the first carrier signal and the signal of frequency $\omega$, and frequency converts the first carrier signal into a signal of a first intermediate frequency $(\omega - \omega 1)$ and a signal of another first intermediate frequency $(\omega + \omega 1)$, and outputs the converted signals; and a second frequency mixer which receives the second carrier signal and the signal of frequency $\omega$, and frequency converts the second carrier signal into a signal of a first intermediate frequency $(\omega 2 - \omega)$ and a signal of another first intermediate frequency $(\omega 2 + \omega)$, and outputs the converted signals.

In the apparatus, the output signal frequency $\omega$ of the first local oscillator is substantially equal to $(\omega 2 + \omega 1)/2$, the average frequency of the frequency $\omega 1$ and the frequency $\omega 2$. Also, $(\omega - \omega 1)$, which is the first intermediate frequency of one of the output signals from the first frequency mixer, and $(\omega 2 - \omega)$, which is the first intermediate frequency of one of the output signals from the second frequency mixer, are each substantially equal to $(\omega 2 - \omega 1)/2$.

According to another aspect of the present invention, there is provided a radio signal parallel processing method by which a first carrier signal of frequency $\omega 1$ and a second carrier signal of frequency $\omega 2 (\omega 2 > \omega 1)$ are received, the method comprising: (a) generating a signal of a first intermediate frequency $(\omega - \omega 1)$ and a signal of another first intermediate frequency $(\omega + \omega 1)$ by frequency converting the first carrier signal; and (b) generating a signal of a first intermediate frequency $(\omega 2 - \omega)$ and a signal of another first intermediate frequency $(\omega 2 + \omega)$ by frequency converting the second carrier signal.

In the method, the frequency $\omega$ is substantially equal to $(\omega 2 + \omega 1)/2$, which is the average frequency of the frequency $\omega 1$ and the frequency $\omega 2$, and $(\omega - \omega 1)$, which is one of the first intermediate frequencies of step (a), and $(\omega 2 - \omega)$, which is one of the first intermediate frequencies of step (b), are each substantially equal to $(\omega 2 - \omega 1)/2$.

BRIEF DESCRIPTION OF THE DRAWINGS

The above aspects and advantages of the present invention will become more apparent by describing in detail preferred embodiments thereof with reference to the attached drawings in which.

DESCRIPTION OF THE PREFERRED EMBODIMENTS

Figure 1:
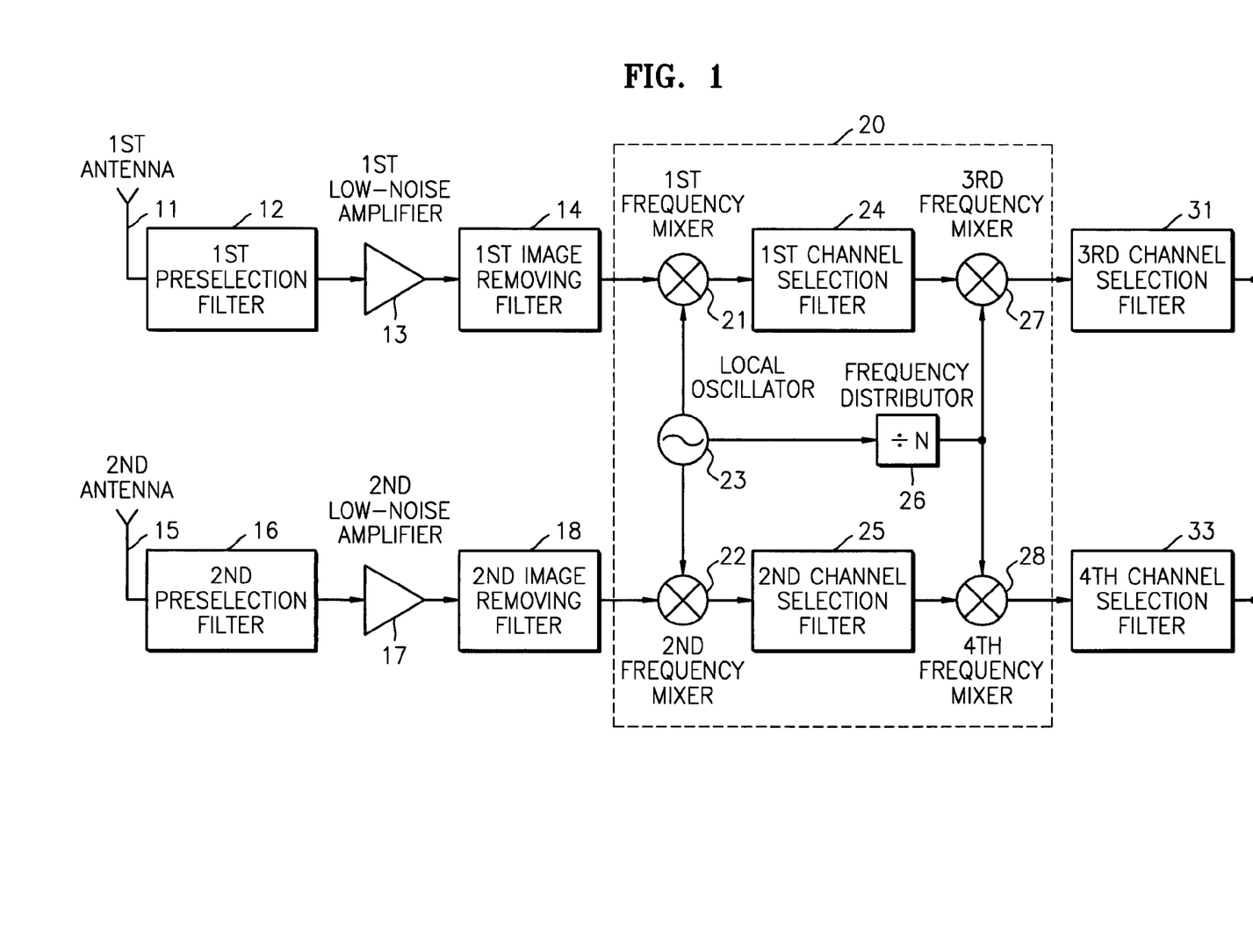
FIG. 1 is a block diagram for describing an apparatus for radio signal parallel processing according to the present invention.

FIG. 1 is a block diagram for describing a radio receiver having an apparatus for radio signal parallel processing according to the present invention.

Referring to FIG. 1, the radio receiver comprises a first antenna 11, a first preselection filter 12, a first low-noise amplifier 13, a first image removing filter 14, a second antenna 15, a second preselection filter 16, a second low-noise amplifier 17, a second image removing filter 18, a radio signal parallel processing apparatus 20, a third channel selection filter 31, and a fourth channel selection filter 33.

The radio signal parallel processing apparatus 20 comprises a first frequency mixer 21, a second frequency mixer 22, a local oscillator 23, a first channel selection filter 24, a second channel selection filter 25, a frequency distributor 26, a third frequency mixer 27, and a fourth frequency mixer 28.

The radio receiver shown in FIG. 1 is a dual IF heterodyne receiver.

The first antenna 11 receives a first carrier signal of frequency $\omega 1$.

The first preselection filter 12 receives the first carrier signal from the first antenna 11, passes a signal corresponding to a predetermined band frequency centered at the frequency ω1, and removes noise in other frequency bands. The first preselection filter 12 is a type of band pass filter.

The first low-noise amplifier 13 receives the output signal from the first preselection filter 12 and amplifies the signal, maintaining low level noise generation.

The first image removing filter 14 receives the output signal from the first low-noise amplifier 13 and removes the image produced by amplification. The first image removing filter 14 is a type of band pass filter and uses less bandwidth than the first preselection filter 12.

The second antenna 15 receives a second carrier signal of frequency ω2. The frequency ω2 is a value greater than the frequency ω1. The functions of the second preselection filter 16, the second low-noise amplifier 17, and the second image removing filter 18 are identical to those of the first preselection filter 12, the first low-noise amplifier 13, and the first image removing filter 14, respectively.

In the present embodiment, two carrier signals are received, and two antennas 11 and 15, two preselection filters 12 and 16, two low-noise amplifiers 13 and 17, and two image removing filters 14 and 18 are used for preprocessing the signals. However, two carrier signals can be received and preprocessed with one antenna, one preselection filter, one low-noise filter, and one image removing filter.

The radio signal parallel processing apparatus 20 processes the preprocessed first carrier signal of frequency ω1 and second carrier signal of frequency ω2 in parallel and outputs two baseband signals. For convenience of explanation, it is assumed that the frequency ω1 of the first carrier signal is 1 GHz and the frequency ω2 of the second carrier signal is 5 GHz.

FIGS. 3*a* through 3*d* are diagrams of frequency spectrums describing the operation of the radio signal parallel processing apparatus 20 according to the present invention. Referring to FIGS. 3*a* through 3*d*, the operation of the radio signal parallel processing apparatus 20, according to the present invention, will now be explained.

First, the local oscillator 23 outputs a signal of frequency ω, which is an average value of the frequency ω1 of the first carrier signal and the frequency ω2 of the second carrier signal. That is, the frequency ω is determined according to the following Equation 1:

$$\omega = (\omega 1 + \omega 2)/2 \quad (1)$$

Therefore, since ω1 is 1 GHz and ω2 is 5 GHz, the frequency ω is 3 GHz.

Figure 3A:
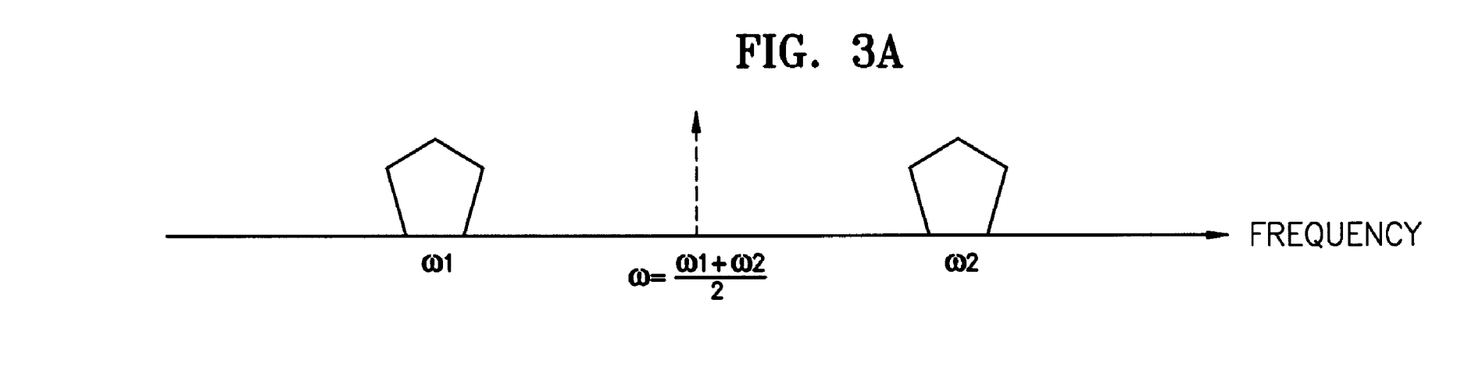
FIGS. 3a through 3d are diagrams of frequency spectrums explaining the operation of an apparatus for radio signal parallel processing according to the present invention.

FIG. 3*a* shows the frequency spectrums of the first carrier signal, the second carrier signal, and the output signal of the local oscillator 23.

The first frequency mixer 21 receives the preprocessed first carrier signal from the first image removing filter 14 and 3 GHz frequency signal from the local oscillator 23 and performs first intermediate frequency conversion.

The operation performed by the first frequency mixer 21 is explained by the following Equation 2:

$$\cos(\omega)\cos(\omega 1) = \frac{1}{2}\{\cos(\omega + \omega 1) + \cos(\omega - \omega 1)\} \quad (2)$$

That is, if the first carrier signal of frequency ω1 is multiplied by the signal of frequency ω output from the local oscillator 23, two outputs are generated, a frequency component of the sum of the two frequencies and a frequency component of the difference of the two frequencies. This process describes first intermediate frequency conversion. Accordingly, the frequencies of the output signals of the first frequency mixer 21 are 2 GHz and 4 GHz. When compared with the first carrier signal, the two outputs have half the amplitude, and frequencies that have changed from 1 GHz to 2 GHz and 4 GHz.

The first channel selection filter 24 removes the 4 GHz output and passes the 2 GHz output.

The operation of the first frequency mixer 21 described above is identical to the operation of other frequency mixers, that is, the second through fourth mixers 22, 27, and 28.

The second frequency mixer 22 receives the 5 GHz second carrier signal and the 3 GHz output signal from the local oscillator 23, and outputs a 2 GHz signal and a 8 GHz signal. That is, the output signal of the same local oscillator 23 is used. A separate local oscillator for performing first intermediate frequency conversion of the second carrier signal is not used.

The second channel selection filter 25 removes the 8 GHz output and passes the 2 GHz output.

The frequencies of the output signals, which are allowed to pass through the first channel selection filter 24 and the second channel selection filter 25, are the same, 2 GHz. The reason is related to the output signal frequency of the local oscillator 23, determined as the average value of the frequency ω1 of the first carrier signal and the frequency ω2 of the second carrier signal. That is, the frequencies of the output signals from the first channel selection filter 24 and the second channel selection filter 25 are explained by the following Equation 3:

$$(\omega - \omega 1) = (\omega 2 - \omega) = (\omega 2 - \omega 1)/2 \quad (3)$$

Since the frequencies of the output signals of the first channel selection filter 24 and the second channel selection filter 25 are the same, each of the two carrier signals which have been first intermediate frequency converted are second intermediate frequency converted using only one local oscillator. This process results in generation of the baseband signals.

Figure 3B:
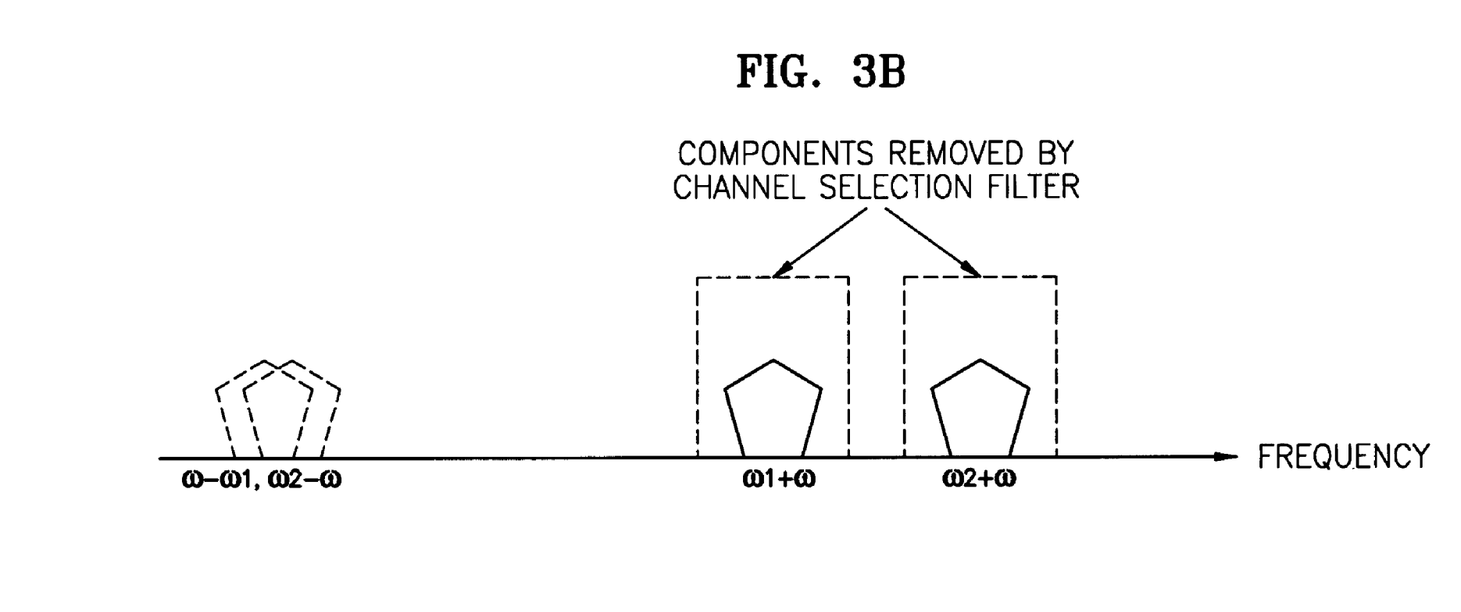

FIG. 3*b* shows frequency spectrums of the output signals of the first frequency mixer 21 and the second frequency mixer 22. In FIG. 3*b*, the frequency components marked by dotted lines, in the high frequency region, are removed by the first channel selection filter 24 and the second channel selection filter 25.

In the present embodiment, a separate local oscillator is not used to produce input for second intermediate frequency conversion, instead, a frequency distributor 26 is employed.

The frequency distributor 26 outputs a signal of frequency ω/N to the third frequency mixer 27 and the fourth frequency mixer 28 for second intermediate frequency conversion. ω/N is obtained by dividing the frequency ω of the output signal of the local oscillator 23 by N. N is determined by the following Equation 4:

$$N = (\omega 2 + \omega 1)/(\omega 2 - \omega 1) \quad (4)$$

If N is determined using Equation 4, the frequency ω/N of the output signal of the frequency distributor 26 becomes the same as the frequency of the output signals of the first channel selection filter 24 and the second channel selection filter 25 of the Equation 3. That is, since frequency ω1 is 1 GHz and frequency ω2 is 5 GHz, N is 1.5, resulting in a 2 GHz frequency of the first channel selection filter 24, the second channel selection filter 25, and the frequency distributor 26.

Figure 3C:
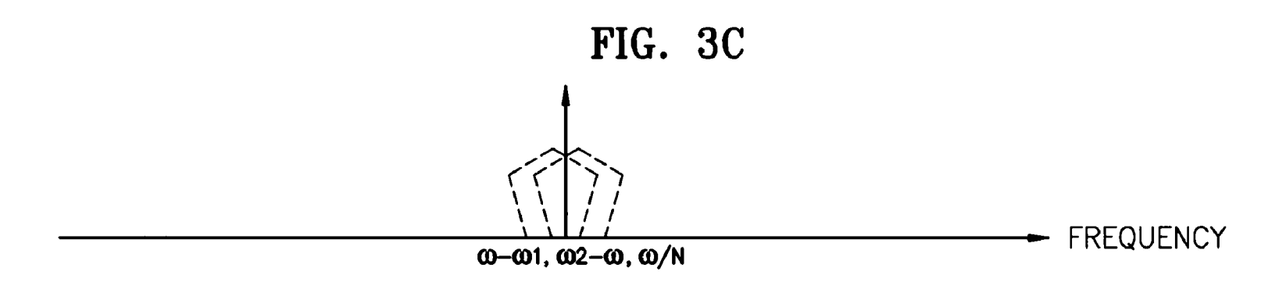
Figure 3D:
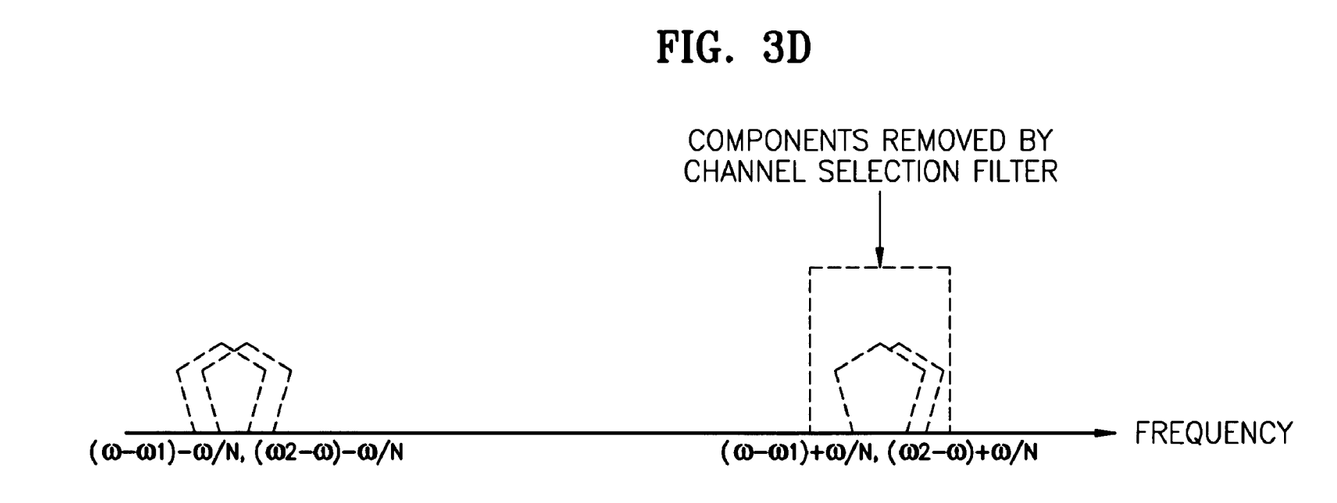

FIG. 3*c* shows the frequency spectrums of the output signals of the first channel selection filter 24, the second channel selection filter 25, and the frequency distributor 26.

The third frequency mixer 27 receives the 2 GHz signal from the first channel selection filter 24 and the 2 GHz signal from the frequency distributor 26, and outputs a baseband signal in the low frequency region, loaded on the first carrier signal, and a 4 GHz high frequency region signal.

The fourth frequency mixer 28 receives the 2 GHz signal from the second channel selection filter 25 and the 2 GHz signal from the frequency distributor 26, and outputs a baseband signal in the low frequency region, loaded on the second carrier signal, and a 4 GHz high frequency region signal.

After receiving the two output signals of the third frequency mixer 27, the third channel selection filter 31 passes the baseband signal in the low frequency region and removes the 4 GHz high frequency region signal.

After receiving the two output signals of the fourth frequency mixer 28, the fourth channel selection filter 33 passes the baseband signal in the low frequency region and removes the 4 GHz high frequency region signal.

FIG. 3$d$ shows the spectrums of the output signals of the third frequency mixer 27 and the fourth frequency mixer 28. In FIG. 3$d$, the frequency components marked by the dotted lines are removed by the third channel selection filter 31 and the fourth channel selection filter 33.

The baseband signals output from the third channel selection filter 31 and the fourth channel selection filter 33 are converted into digital signals by an A/D converter (not shown) and input to a baseband signal processing apparatus (not shown).

Figure 4:
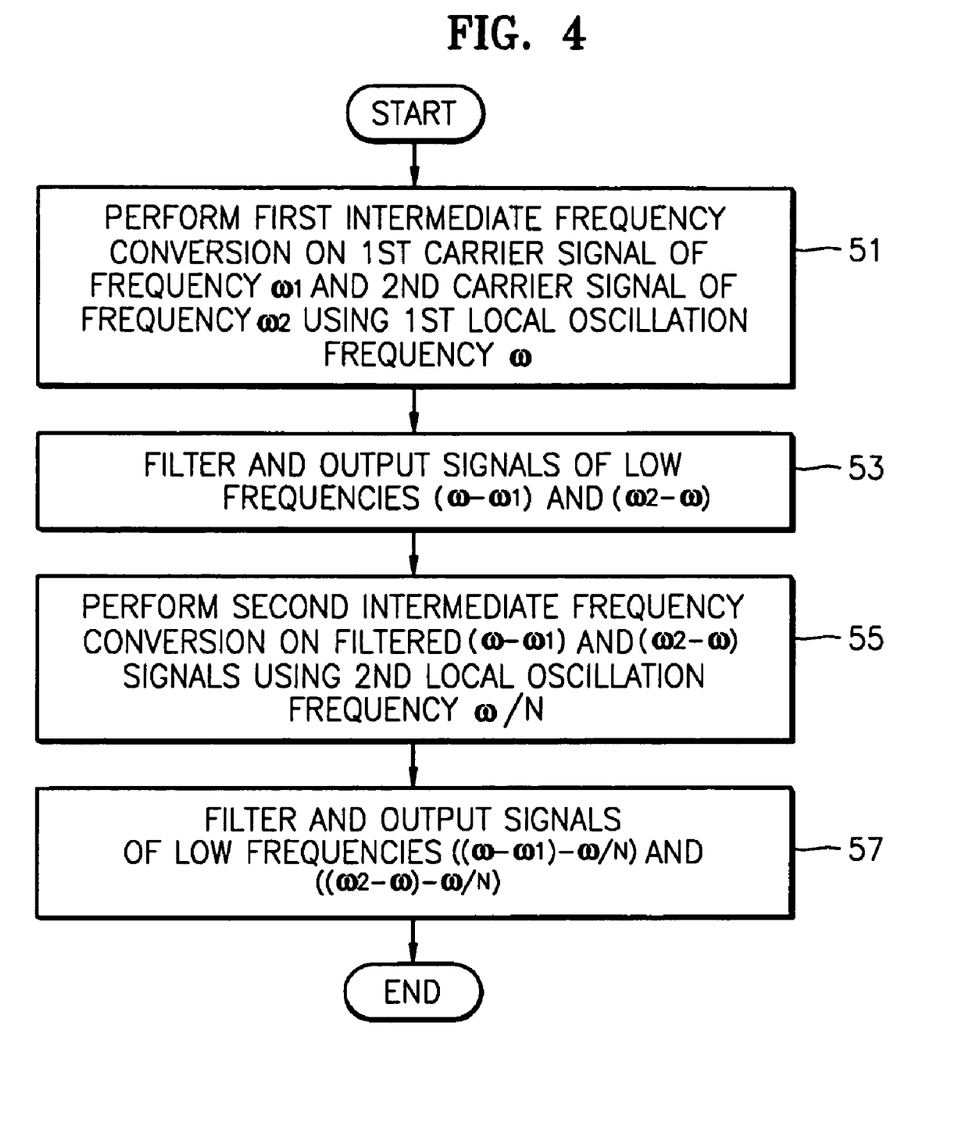
FIG. 4 is a flowchart for describing a method of radio signal parallel processing according to the present invention.

FIG. 4 is a block diagram for describing another embodiment of an apparatus for radio signal parallel processing according to the present invention.

Figure 2:
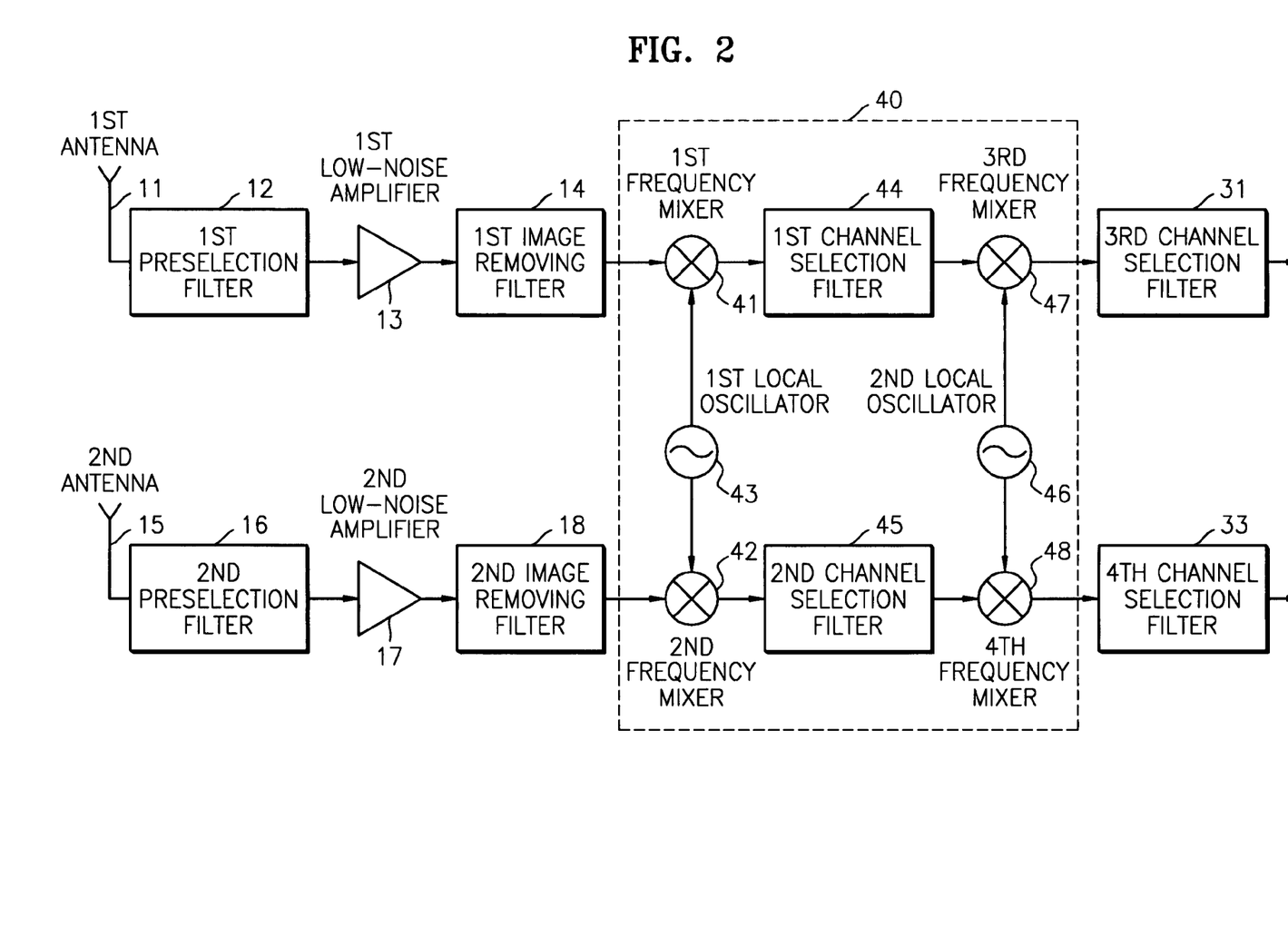
FIG. 2 is a block diagram for describing another embodiment of an apparatus for radio signal parallel processing according to the present invention.

For second intermediate frequency conversion, the radio signal parallel processing apparatus 20 shown in FIG. 1 obtains a second local oscillation frequency by employing the frequency distributor 26, which generates a signal of frequency $\omega/N$ obtained by dividing the frequency $\omega$ of the output signal of the local oscillator 23 by N. The radio signal parallel processing apparatus 40 shown in FIG. 2 employs a separate second local oscillator 46 for generating a signal of frequency $\omega/N$, and outputs the generated signal to a third frequency mixer 47 and a fourth frequency mixer 48. The elements of the radio signal parallel processing apparatus 40 having the same names as those of the radio signal parallel processing apparatus 20 perform the same functions as in FIG. 1. The first local oscillator 43 of FIG. 2 corresponds to the local oscillator 23 of FIG. 1.

FIG. 4 is a flowchart for describing a method of radio signal parallel processing according to the present invention.

In step 51, first intermediate frequency conversion is performed for the first carrier signal of frequency $\omega 1$ and the second carrier signal of frequency $\omega 2(\omega 2>\omega 1)$ using a first local oscillation frequency $\omega$. The first carrier signal is a first intermediate frequency converted into a signal with a first intermediate frequency $(\omega-\omega 1)$ and another signal with a first intermediate frequency $(\omega+\omega 1)$.

The second carrier signal is a first intermediate frequency converted into a signal with a first intermediate frequency $(\omega 2-\omega)$ and another signal with a first intermediate frequency $(\omega 2+\omega)$. By determining frequency $\omega$ as an average frequency of frequencies $\omega 1$ and $\omega 2$, $(\omega-\omega 1)$ and $(\omega-\omega 2)$ are each substantially equal to $(\omega 2-\omega 1)/2$.

In step 51, the high frequency components $(\omega+\omega 1)$ and $(\omega 2+\omega)$ output after first intermediate frequency conversion of the first carrier signal and the second carrier signal, are filtered by channel selection filters, and the signals of $(\omega-\omega 1)$ and $(\omega 2-\omega)$ are output in step 53.

In step 55, second intermediate frequency conversion is performed on the signals of $(\omega-\omega 1)$ and $(\omega 2-\omega)$, using the second local oscillation frequency $\omega/N$. By appropriately selecting the value N, $\omega/N$ is substantially equal to $(\omega-\omega 1)$, $(\omega 2-\omega)$, and $(\omega 2-\omega 1)/2$.

In step 57, the second intermediate frequency converted signals are filtered so that the signals of frequencies $((\omega 1+\omega 2)/2N+(\omega 2-\omega 1)/2))$ and $((\omega 1+\omega 2)/2N+(\omega 2-\omega 1)/2)$ are removed, and the baseband signals in the low frequency region are output. The output baseband signals are converted into digital signals, respectively, by an A/D converter and input to the baseband signal processing apparatus.

Optimum embodiments have been explained above and are shown. However, the present invention is not limited to the exemplary embodiments described above, and it is apparent that variations and modifications by those skilled in the art can be effected within the spirit and scope of the present invention defined in the appended claims. Therefore, the scope of the present invention is not determined by the above description but by the accompanying claims.

According to the radio signal parallel processing apparatus and method of the present invention, two carrier signals, having different frequencies, are processed in parallel such that the capacity of data reception and transmission increases and the two carrier signals are converted into intermediate frequencies using one local oscillator. Accordingly, the complexity of implementing the apparatus is low and the cost of manufacturing the apparatus is reduced.

What is claimed is:

1. A radio signal parallel processing apparatus which receives and processes in parallel a first carrier signal of a frequency $\omega 1$ and a second carrier signal of a frequency $\omega 2$ ($\omega 2>\omega 1$), the apparatus comprising:

a first local oscillator which outputs a signal of a frequency $\omega$ as an output signal of the first local oscillator;

a first frequency mixer which receives the first carrier signal and the signal of the frequency $\omega$, and frequency converts the first carrier signal into a first signal of a first intermediate frequency $(\omega-\omega 1)$ and a first signal of another first intermediate frequency $(\omega+\omega 1)$, and outputs the first signals of the first intermediate frequencies $(\omega-\omega 1)$ and $(\omega+\omega 1)$ as output signals of the first frequency mixer; and a second frequency mixer which receives the second carrier signal and the signal of the frequency $\omega$, and frequency converts the second carrier signal into a second signal of a first intermediate frequency $(\omega 2-\omega)$ and a second signal of another first intermediate frequency $(\omega 2+\omega)$ and outputs the second signals of the first intermediate frequencies $(\omega 2-\omega)$ and $(\omega 2+\omega)$ as output signals of the second frequency mixer, wherein the first frequency mixer is operable to convert the first carrier signal in parallel with the second frequency mixer converting the second carrier signal.

2. The apparatus of claim 1, wherein the frequency $\omega$ of the output signal of the first local oscillator is substantially equal to $(\omega 2\ \omega 1)/2$, which is an average frequency of the frequency $\omega 1$ and the frequency $\omega 2$, and $(\omega-\omega 1)$, which is the first intermediate frequency $(\omega-\omega 1)$ of one of the output signals of the first frequency mixer, and $(\omega 2-\omega)$, which is the first intermediate frequency $(\omega 2\omega)$ of one of the output signals of the second frequency mixer, are each substantially equal to $(\omega 2-\omega 1)/2$.

3. A radio signal parallel processing apparatus which receives and processes in parallel a first carrier signal of a frequency $\omega 1$ and a second carrier signal of a frequency $\omega 2$ ($\omega 2>\omega 1$), the apparatus comprising:

a first local oscillator which outputs a signal of a frequency $\omega$ as an output signal of the first local oscillator;

a first frequency mixer which receives the first carrier signal and the signal of the frequency $\omega$, and frequency converts the first carrier signal into a first signal of a first intermediate frequency $(\omega-\omega 1)$ and a first signal of another first intermediate frequency $(\omega+\omega 1)$, and outputs the first signals of the first intermediate frequencies $(\omega-\omega i)$ and $(\omega\omega i)$ as output signals of the first frequency mixer; and a second frequency mixer which receives the second carrier signal and the signal of the frequency $\omega$, and frequency converts the second carrier signal into a second signal of a first intermediate frequency $(\omega 2-\omega)$ and a second signal of another first intermediate frequency $(\omega 2+\omega)$ and outputs the second signals of the first intermediate frequencies $(\omega 2-\omega)$ and $(\omega 2+\omega)$ as output signals of the second frequency mixer, wherein the frequency $\omega$ of the output signal of the first local oscillator is substantially equal to $(\omega 2+\omega 1)/2$, which is an average frequency of the frequency $\omega 1$ and the frequency $\omega 2$, and $(\omega-\omega 1)$, which is the first intermediate frequency $(\omega-\omega 1)$ of one of the output signals of the first frequency mixer, and $(\omega 2-\omega)$, which is the first intermediate frequency $(\omega 2-\omega)$ of one of the output signals of the second frequency mixer, are each substantially equal to $(\omega 2-\omega 1)/2$, the apparatus further comprising:

a first channel selection filter which receives the outputs of the first frequency mixer, removes the first signal of the first intermediate frequency $(\omega+\omega 1)$, and outputs the first signal of a first intermediate frequency $(\omega 2-\omega 1)/2$ as an output signal of the first channel selection filter, wherein the first signal of the first intermediate frequency $(\omega-\omega 1)$ is substantially equal to the first signal of the first intermediate frequency $(\omega 2-\omega 1)$;

a second channel selection filter which receives the outputs of the second frequency mixer, removes the signal of the first intermediate frequency $(\omega 2+\omega)$, and outputs the second signal of the first intermediate frequency $(\omega 2\ \omega 1)/2$ as an output signal of the second channel selection filter, wherein the second signal of the first intermediate frequency $(\omega 2-\omega)$ is substantially equal to the second signal of the first intermediate frequency $(\omega 2\ \omega 1)/2$;

a frequency distributor which receives the signal of the frequency $(\omega 1+\omega 2)/2$ from the first local oscillator and outputs a signal of a frequency $(\omega 1+\omega 2)/2N$ as an output signal of the frequency distributor;

a third frequency mixer which receives the first signal of the first intermediate frequency $(\omega 2\ \omega 1)/2$ from the first channel selection filter and the signal of the frequency $(\omega 1+\omega 2)/2N$ from the frequency distributor, frequency converts the first signal of the first intermediate frequency $(\omega 2-\omega 1)/2$ into a first signal of a second intermediate frequency $((\omega 1+\omega 2)/2N-(\omega 2-\omega 1)/2)$ and a first signal of another second intermediate frequency $((\omega 1+\omega 2)/2N+(\omega 2\ -\omega 1)/2)$, and outputs the first signals of the second intermediate frequencies $((\omega 1+\omega 2)/2N-(\omega 2\ -\omega 1)/2)$ and $(\omega 1+\omega 2)/2N+(\omega 2-\omega 1)/2)$ as output signals of the third frequency mixer; and a fourth frequency mixer which receives the second signal of the first intermediate frequency $(\omega 2-\omega 1)/2$ from the second channel selection filter and the signal of the frequency $(\omega 1+\omega 2)/2N$ from the frequency distributor, frequency converts the first signal of the first intermediate frequency $(\omega 2-\omega 1)/2$ into a first signal of the second intermediate frequency $((\omega 1\ +\omega 2)/2N-(\omega 2-\omega 1)/2)$ and a first signal of the another second intermediate frequency $((\omega 1+\omega 2)/2N+(\omega 2-\omega 1)/2)$ and outputs the first signals of the second intermediate frequencies $((\omega 1+\omega 2)/2N-(\omega 2-\omega 1)/2)$ and $((\omega 1+\omega 2)/2N+(\omega 2-\omega 1)/2)$ as output signals of the fourth frequency mixer.

4. The apparatus of claim 3, wherein the value N of the frequency distributor is determined so that the frequency of the output signal of the frequency distributor, the frequency of the output signal of the first channel selection filter, and the frequency of the output signal of the second channel selection filter are substantially equal.

5. A radio signal parallel processing apparatus which receives and processes in parallel a first carrier signal of a frequency $\omega 1$ and a second carrier signal of a frequency $\omega 2$ $(\omega 2>\omega 1)$, the apparatus comprising:

a first local oscillator which outputs a signal of a frequency $\omega$ as an output signal of the first local oscillator;

a first frequency mixer which receives the first carrier signal and the signal of the frequency $\omega$, and frequency converts the first carrier signal into a first signal of a first intermediate frequency $(\omega-\omega 1)$ and a first signal of another first intermediate frequency $(\omega+\omega 1)$, and outputs the first signals of the first intermediate frequencies $(\omega-\omega 1)$ and $(\omega+\omega 1)$ as output signals of the first frequency mixer; and a second frequency mixer which receives the second carrier signal and the signal of the frequency $\omega$, and frequency converts the second carrier signal into a second signal of a first intermediate frequency $(\omega 2-\omega)$ and a second signal of another first intermediate frequency $(\omega 2+\omega)$ and outputs the second signals of the first intermediate frequencies $(\omega 2-\omega)$ and $(\omega 2+\omega)$ as output signals of the second frequency mixer, wherein the frequency 107 of the output signal of the first local oscillator is substantially equal to $(\omega 2+\omega 1)/2$, which is an average frequency of the frequency $\omega 1$ and the frequency $\omega 2$, and $(\omega-\omega 1)$, which is the first intermediate frequency $(\omega-\omega 1)$ of one of the output signals of the first frequency mixer, and $(\omega 2-\omega)$, which is the first intermediate frequency $(\omega 2-\omega)$ of one of the output signals of the second frequency mixer, are each substantially equal to $(\omega 2-\omega 1)/2$, the apparatus further comprising:

a first channel selection filter, which receives the output signals of the first frequency mixer, removes the first signal of the first intermediate frequency $(\omega+\omega 1)$, and outputs the first signal of a first intermediate frequency $(\omega 2-\omega 1)/2$ as an output signal of the first channel selection filter, wherein the first signal of the first intermediate frequency $(\omega-\omega 1)$ is substantially equal to the first signal of the first intermediate frequency $(\omega 2-\omega 1)/2$;

a second channel selection filter, which receives the output signals of the second frequency mixer, removes the second signal of the first intermediate frequency $(\omega 2+\omega)$, and outputs the second signal of the first intermediate frequency $(\omega 2-\omega 1)/2$;

a second local oscillator, which outputs a signal of a frequency $(\omega 1+\omega 2)/2N$ obtained by dividing the frequency $(\omega 1+\omega 2)/2$ of the output signal of the first local oscillator by N as an output of the second local oscillator;

a third frequency mixer which receives the first signal of the first intermediate frequency $(\omega 2-\omega 1)/2$ from the first channel selection filter and the signal of the frequency $(\omega 1+\omega 2)/2N$ from the second local oscillator, frequency converts the first signal of the first intermediate frequency ($\omega2-\omega1$)/2 into a first signal of a second intermediate frequency (($\omega1+\omega2$)/2N−($\omega2-\omega1$)/2) and a first signal of another second intermediate frequency (($\omega1+\omega2$)/2N+($\omega2-\omega1$)/2), and outputs the first signals of the second intermediate frequencies (($\omega1+\omega2$)/2N−($\omega2-\omega1$)/2) and (($\omega1+\omega2$)/2N+($\omega2-\omega1$)/2) as output signals of the third frequency mixer; and a fourth frequency mixer which receives the second signal of the first intermediate frequency ($\omega2-\omega1$)/2 from the second channel selection filter and the signal of frequency ($\omega1+\omega2$)/2N from the second local oscillator, frequency converts the second signal of the first intermediate frequency ($\omega2-\omega1$)/2 into a second signal of the second intermediate frequency (($\omega1+\omega2$)/2N−($\omega2-\omega1$)/2) and a second signal of another second intermediate frequency (($\omega1+\omega2$)/2N+($\omega2-\omega1$)/2), and outputs the second signals of the second intermediate frequencies (($\omega1+\omega2$)/2N−($\omega2-\omega1$)/2) and ($\omega1+\omega2$)/2N+($\omega2-\omega1$ )/2) as output signals of the fourth frequency mixer.

6. The apparatus of claim 5, wherein the value N of the second local oscillator is determined so that the frequency of the output signal of the second local oscillator, the frequency of the output signal of the first channel selection filter, and the frequency of the output signal of the second channel selection filter are substantially equal.

7. The apparatus of claim 3, further comprising:
a third channel selection filter which receives the output of the third frequency mixer, removes the first signal of the other second intermediate frequency (($\omega1+\omega2$)/2N+($\omega2-\omega1$)/2), and outputs the first signal of the second intermediate frequency (($\omega1+\omega2$)/2N−($\omega2 \omega1$)/2); and a fourth channel selection filter which receives the output of the fourth frequency mixer, removes the second signal of the other second intermediate frequency (($\omega1+\omega2$)/2N ($\omega2-\omega1$)/2), and outputs the second signal of the second intermediate frequency (($\omega1+\omega2$)/2N−($\omega2 -\omega1$)/2).

8. A radio signal parallel processing method by which a first carrier signal of a frequency $\omega1$ and a second carrier signal of a frequency $\omega2$ ($\omega2>\omega1$) are received, the method comprising:

(a) generating a first signal of a first intermediate frequency ($\omega-\omega1$) and a first signal of another first intermediate frequency ($\omega+\omega1$) by frequency converting the first carrier signal; and (b) generating a second signal of a first intermediate frequency ($\omega2-\omega$) and a second signal of another first intermediate frequency ($\omega2+\omega$) by frequency converting the second carrier signal, wherein the operation (a) and the operation (b) are carried out in parallel.

9. The method of claim 8, wherein the frequency $\omega$ is substantially equal to ($\omega2+\omega1$)/2, which is an average frequency of the frequency $\omega1$ and the frequency $\omega2$, and ($\omega-\omega1$), which is the first intermediate frequency ($\omega+\omega1$) of step (a), and ($\omega2-\omega$), which is the first intermediate frequency ($\omega2-\omega$) of step (b), are each substantially equal to ($\omega2-\omega1$)/2.

10. A radio signal parallel processing method by which a first carrier signal of a frequency $\omega1$ and a second carrier signal of a frequency $\omega2$ ($\omega2>\omega1$) are received, the method comprising:

(a) generating a first signal of a first intermediate frequency ($\omega-\omega1$) and a first signal of another first intermediate frequency ($\omega-\omega1$) by frequency converting the first carrier signal; and (b) generating a second signal of a first intermediate frequency ($\omega2-\omega$) and a second signal of another first intermediate frequency ($\omega2+\omega$) by frequency converting the second carrier signal, wherein the frequency $\omega$ is substantially equal to ($\omega2+\omega1$)/2, which is an average frequency of the frequency $\omega1$ and the frequency $\omega2$, and ($\omega-\omega1$), which is the first intermediate frequency ($\omega+\omega1$) of step (a), and ($\omega2-\omega$), which is the first intermediate frequency ($\omega2-\omega$) of step (b), are each substantially equal to ($\omega2-107\ 1$)/2, the method further comprising:

(c) removing the first signal of the first intermediate frequency ($\omega+\omega1$) generated in step (a) and outputting the first signal of a first intermediate frequency ($\omega2-\omega1$)/2, wherein the first signal of the first intermediate frequency ($\omega-\omega1$) is substantially equal to the first signal of the first intermediate frequency ($\omega2-\omega1$)/2;

(d) removing the second signal of the first intermediate frequency ($\omega2+\omega$) generated in step (b), and outputting the second signal of the first intermediate frequency ($\omega2-\omega1$)/2, wherein the second signal of the first intermediate frequency ($\omega2-\omega$) is substantially equal to the second signal of the first intermediate frequency ($\omega2-\omega1$)/2;

(e) generating a first signal of a second intermediate frequency (($\omega1+\omega2$)/2N−($\omega2-\omega1$)/2) and a first signal of another second intermediate frequency (($\omega1+\omega2$)/2N+($\omega2 -\omega1$)/2) by frequency converting the first signal of the first intermediate frequency ($\omega2-\omega1$)/2 which is output in step (c); and (f) generating a second signal of the second intermediate frequency (($\omega1+\omega2$)/2N−($\omega2 -\omega1$)/2) and a second signal of the another second intermediate frequency (($\omega1+\omega2$)/2N+($\omega2 -\omega1$)/2) by frequency converting the second signal of the first intermediate frequency ($\omega2-\omega1$)/2 which is output in step (d).

11. The method of claim 10, wherein in any one of the steps (e) and (f), the value N is selected as a predetermined value so that the second intermediate frequency (($\omega1+\omega2$)/2N−($\omega2-\omega1$)/2) is substantially equal to 0.

12. The method of claim 10, further comprising:
(g) removing the first signal of the second intermediate frequency (($\omega1+\omega2$)/2N+($\omega2-\omega1$)/2) generated in step (e) and outputting the first signal of the second intermediate frequency (($\omega1+\omega2$)/2N−($\omega2 \omega1$)/2); and (h) removing the second signal of the second intermediate frequency (($\omega1+\omega2$)/2N+($\omega2-\omega1$)/2) generated in step (f), and outputting the second signal of the second intermediate frequency (($\omega1+\omega2$)/2N−($\omega2-\omega1$)/2).

13. A radio signal parallel processing apparatus for receiving and processing in parallel a first signal of a frequency $\omega1$ and a second signal of a frequency $\omega2$ ($\omega2 >\omega1$), the apparatus comprising:

a first oscillating means for outputting a first oscillating signal of a frequency $\omega$ as an output signal of the first oscillating means for outputting;

a first mixing means for receiving the first signal of the frequency $\omega1$ and the first oscillating signal of the frequency $\omega$, and outputting a first mixing output comprising:
an A1 frequency ($\omega-\omega1$) component and
an A2 frequency ($\omega+\omega1$) component; and a second mixing means for receiving the second signal of the frequency $\omega 2$ and the first oscillating signal of the frequency $\omega$, and outputting a second mixing output comprising:
  a B1 frequency $(\omega 2-\omega)$ component and
  a B2 frequency $(\omega 2-\omega)$ component,
wherein the first mixing means outputs the first mixing output and the second mixing means outputs the second mixing output in parallel.

14. The apparatus of claim 13, wherein the first oscillating signal of the frequency $\omega$ comprises an average of the frequency $\omega 1$ and the frequency $\omega 2$, and $(\omega-\omega 1)$ and $(\omega 2-\omega)$ are each substantially equal to $(\omega 2-\omega 1)/2$.

15. A radio signal parallel processing apparatus for receiving and processing in parallel a first signal of a frequency $\omega 1$ and a second signal of a frequency $\omega 2$ ($\omega 2 > \omega 1$), the apparatus comprising:
  a first oscillating means for outputting a first oscillating signal of a frequency $\omega$ as an output signal of the first oscillating means for outputting;
  a first mixing means for receiving the first signal of the frequency $\omega 1$ and the first oscillating signal of the frequency $\omega$, and outputting a first mixing output comprising:
    an A1 frequency $(\omega-\omega 1)$ component and
    an A2 frequency $(\omega-\omega 1)$ component; and
  a second mixing means for receiving the second signal of the frequency $\omega 2$ and the first oscillating signal of the frequency $\omega$, and outputting a second mixing output comprising:
    a B1 frequency $(\omega 2-\omega)$ component and
    a B2 frequency $(\omega 2-\omega)$ component,
  wherein the first oscillating signal of the frequency $\omega$ comprises an average of the frequency $\omega 1$ and the frequency $\omega 2$, and $(\omega-\omega 1)$ and $(\omega 2-\omega)$ are each substantially equal to $(\omega 2-\omega 1)/2$,
  the apparatus further comprising:
  a first filtering means receiving the first mixing output, removing the A2 frequency $(\omega+\omega 1)$ component, and outputting the A1 frequency $(\omega-\omega 1)$ component as a first filtered output of a frequency $(\omega 2-\omega 1)/2$;
  a second filtering means receiving the second mixing output, removing the B2 frequency $(\omega 2+\omega)$ component, and outputting the B1 frequency $(2\omega-\omega)$ component as a second filtered output of frequency $(\omega 2-\omega 1)/2$;
  a processing means for receiving the first oscillating signal of the frequency $\omega$ and outputting a processing signal of a frequency $(\omega 1+\omega 2)/2N$;
  a third mixing means receiving the first filtered output of the frequency $(\omega 2-\omega 1)/2$ and the processing signal of the frequency $(\omega 1+\omega 2)/2N$, and outputting a third mixed output comprising:
    a C1 frequency $((\omega 1+\omega 2)/2N-(\omega 2-\omega 1)/2)$ component and
    a C2 frequency $((\omega 1+\omega 2)/2N+(\omega 2-\omega 1)/2)$ component; and
  a fourth mixing means receiving the second filtered output of the frequency $(\omega 2-\omega 1)/2$ and the processing signal of the frequency $(\omega 1+\omega 2)/2N$, and outputting a fourth mixed output comprising:
    a D1 frequency $((\omega 1+\omega 2)/2N-(\omega 2-\omega 1)/2)$ component and
    a D2 frequency $((\omega 1+\omega 2)/2N+(\omega 2-\omega 1)/2)$ component.

16. The apparatus of claim 15, further comprising:
  a third filtering means receiving the third mixed output, removing the C2 frequency $((\omega 1+\omega 2)/2N+(\omega 2-\omega 1)/2)$ component, and outputting the C1 frequency $((\omega 1+\omega 2)/2N-(\omega 2-\omega 1)/2)$ component; and
  a fourth filtering means receiving the fourth mixed output, removing the D2 frequency $((\omega 1+\omega 2)/2N+(\omega 2-\omega 1)/2)$ component, and outputting the D1 frequency $((\omega 1+\omega 2)/2N-(\omega 2-\omega 1)/2)$ component.

17. The apparatus of claim 1, wherein the output signal of the first frequency mixer and the output signal of the second frequency mixer are generated in parallel.

* * * * *